United States Patent
Soane et al.

(10) Patent No.: US 10,875,796 B2
(45) Date of Patent: Dec. 29, 2020

(54) ACID MINE DRAINAGE TREATMENT (71) Applicant: Soane Mining, LLC, Palm Beach Gardens, FL (US)

(72) Inventors: David S. Soane, Palm Beach, FL (US); James Nathan Ashcraft, Jupiter, FL (US); Allison Greene, Hillsboro Beach, FL (US)

(73) Assignee: Soane Mining, LLC, Palm Beach Gardens, FL (US)

( * ) Notice: Subject to any disclaimer, the term of this patent is extended or adjusted under 35 U.S.C. 154(b) by 0 days.

(21) Appl. No.: 16/155,121

(22) Filed: Oct. 9, 2018

(65) Prior Publication Data

US 2019/0284068 A1  Sep. 19, 2019

Related U.S. Application Data

(63) Continuation of application No. PCT/US2017/026915, filed on Apr. 11, 2017.

(60) Provisional application No. 62/347,466, filed on Jun. 8, 2016, provisional application No. 62/320,786, filed on Apr. 11, 2016.

(51) Int. Cl.
  *C02F 1/66*  (2006.01)
  *C02F 1/68*  (2006.01)
  *C02F 11/14*  (2019.01)
  *C02F 103/10*  (2006.01)

(52) U.S. Cl.
  CPC ............ *C02F 1/66* (2013.01); *C02F 1/683* (2013.01); *C02F 11/14* (2013.01); *C02F 2103/10* (2013.01); *C02F 2305/14* (2013.01)

(58) Field of Classification Search
  CPC ........................................................ C02F 1/66
  See application file for complete search history.

(56) References Cited

U.S. PATENT DOCUMENTS

| | | | |
|---|---|---|---|
| 8,349,188 B2 | 1/2013 | Soane et al. | |
| 8,353,641 B2 | 1/2013 | Berg et al. | |
| 8,557,123 B2 | 10/2013 | Berg et al. | |
| 8,821,733 B2 | 9/2014 | Soane et al. | |
| 8,894,863 B2 | 11/2014 | Soane et al. | |
| 8,945,394 B2 | 2/2015 | Kincaid et al. | |
| 9,458,040 B2 | 10/2016 | Berg et al. | |
| 9,493,367 B2 | 11/2016 | Soane et al. | |
| 9,758,396 B2 | 9/2017 | Berg et al. | |

(Continued)

OTHER PUBLICATIONS

Soane et al., U.S. Appl. No. 16/583,607, filed Sep. 26, 2019.

(Continued)

*Primary Examiner* — Peter Keyworth (74) *Attorney, Agent, or Firm* — Elmore Patent Law Group, P.C.; Mahreen Chaudhry-Hoda; Carolyn S. Elmore (57) ABSTRACT

The invention is directed to methods of neutralizing acid drainage from particulate mining waste, comprising consolidating the particulate mining waste to form a consolidated waste solid; adding a hydrophobizing material into the consolidated waste solid, and incorporating into the consolidated waste solid a controlled release base formulation, wherein the controlled release base formulation comprises a particulate base and a controlled release system, and wherein the controlled release base formulation responds to a decrease in pH from acid drainage to release the particulate base, thereby neutralizing the acid drainage.

14 Claims, 6 Drawing Sheets

(56) References Cited

U.S. PATENT DOCUMENTS

| | | | |
|---|---|---|---|
| 10,399,873 | B2 | 9/2019 | Kincaid et al. |
| 2004/0094484 | A1 | 5/2004 | Zhuang et al. |
| 2011/0094970 | A1* | 4/2011 | Kincaid ............ B01D 21/0012 210/726 |
| 2012/0160751 | A1 | 6/2012 | Lee et al. |
| 2015/0299006 | A1 | 10/2015 | Kincaid et al. |
| 2017/0101332 | A1 | 4/2017 | Soane et al. |
| 2017/0203982 | A1 | 7/2017 | Berg et al. |
| 2019/0177193 | A1 | 6/2019 | Soane et al. |

OTHER PUBLICATIONS

Kincaid et al., U.S. Appl. No. 16/518,463, filed Jul. 22, 2019.
"Acid mine drainage", Wikipedia, (Feb. 10, 2016) [online] [retrieved on Jun. 7, 2017]. Retrieved from the Internet <URL: https://en.wikipedia.org/wiki/Acid_mine_drainage&oldid=704192976> p. 1-5.
"Calcium carbonate", Wikipedia, (Mar. 24, 2016) [online] [retrieved on Jun. 7, 2017]. Retrieved from the Internet <URL: https://en.wikipedia.org/wiki/Calcium_carbonate&oldid=711751646> p. 1-6.
"Precipitated Calcium Carbonate (PCC)", (Mar. 17, 2016) [online] Mineral Technologies. [retrieved on Jun. 7, 2017]. Retrieved from the Internet <URL: https://web.archive.org/web/20160317085208/http://www.mineralstech.com/Pages/SMI/Precipitated-Calcium-Carbonate-(PCC).aspx> p. 1-3.
Flora, J. R. et al., "Preparation of acidic and alkaline macrocapsules for pH control", Chemosphere, vol. 70, Issue 6, Jan. 2008, 1077-1084.
Martin, C. S. "Controlled Release of Alkalinity Using pH-Responsive Polymer Carriers", Diss. Tufts Univ. (Aug. 2016) [online] [retrieved on Jun. 6, 2017]. Retrieved from the Internet <URL: http://search.proquest.com/openview/7c0ae637b229b7b53931107af8d5f57a/1?pqorigsite=gscholar&cbl=18750&diss=y> entire document.
Soane et al., U.S. Appl. No. 16/786,757, filed Feb. 10, 2020.
Berg et al., U.S. Appl. No. 16/787,597, filed Feb. 11, 2020.

* cited by examiner

ACID MINE DRAINAGE TREATMENT

RELATED APPLICATIONS

This application is a continuation of International Application No. PCT/US2017/026915, which designated the United States and was filed on Apr. 11, 2017, published in English, which claims the benefit of U.S. Provisional Application No. 62/320,786, filed on Apr. 11, 2016, and U.S. Provisional Application Ser. No. 62/347,466 filed on Jun. 8, 2016. The entire teachings of the above applications are incorporated by reference herein.

FIELD OF THE APPLICATION

This application relates to formulations and methods for treating acid mine drainage.

BACKGROUND

Acid mine drainage is formed when the ore in metal mines containing sulfide minerals becomes exposed to air and water, reacting to form sulfuric acid. Mining operations extract ore through pulverizing the rock, exposing and increasing the surface area of any sulfide minerals present. Once these minerals are exposed to air and water flows over them, acid runoff, also known as acid mine drainage ("AMD"), can occur. When the acid runoff travels downstream, it can leach toxic heavy metals from the rock surrounding it. Additionally, certain bacteria that thrive in acidic environments can exacerbate sulfuric acid production. Without any treatment or containment, the acidic water can enter the water supply and cause other significant environmental problems. For example, AMD can severely impact aquatic life due to reduced pH levels, contaminate drinking water, and corrode infrastructures.

AMD is generally treated with an acid neutralizing agent, such as limestone, that raises pH levels. However, this treatment forms iron precipitates, which can further harm the environment. Therefore, preventing AMD altogether would be preferable to treating AMD after it occurs.

Mine tailings can compound the problem of AMD. In general, mine tailings consist of a slurry of fine and coarse particles that are left over after the valuable portion of an ore is removed. When the ore contains sulfur-bearing minerals, as is the case in many metal mines, the tailings contain sulfur-bearing materials too. These tailings are acidic. If the acidic tailings are neutralized with fresh water or a base such as limestone, they can have a slightly higher pH and an orange-yellow color. This formation is known as "yellow boy." This color is caused by the precipitation of iron oxide, iron hydroxide, or oxyhydroxides when the pH of the acidic water is raised.

While dry stacking is more convenient for tailings management in general, it has not been suitable for tailings because the dried tailings are vulnerable to oxidation and subsequent acidification. To prevent AMD that arises from tailings, treatments have been employed to limit their exposure to oxygen, for example, storing tailings in slurry form underwater to limit their exposure to dissolved oxygen, and flooding and sealing underground mines to capture the tailings. These treatments are cumbersome though, and expensive. There remains a need in the art, therefore, for an efficient way to manage tailings while preventing or decreasing the production of AMD from these materials.

SUMMARY

Disclosed herein, in embodiments, are methods of neutralizing acid drainage from particulate mining waste, comprising consolidating the particulate mining waste to form a consolidated waste solid; adding a hydrophobizing material into the consolidated waste solid, and incorporating into the consolidated waste solid a controlled release base formulation, wherein the controlled release base formulation comprises a particulate base and a controlled release system, and wherein the controlled release base formulation responds to a decrease in pH from acid drainage to release the particulate base, thereby neutralizing the acid drainage. In embodiments, the hydrophobizing material comprises hydrophobic particles. In embodiments, the hydrophobic particles are used as anchor particles. In embodiments, the hydrophobic particles are intrinsically hydrophobic. In embodiments, the hydrophobic particles comprise a substrate having a hydrophobic modification. In embodiments, the substrate comprises calcium carbonate, which can be a precipitated calcium carbonate. In embodiments, the controlled release system comprises a polymeric coating applied to the particulate base. In embodiments, the controlled release system comprises a polymeric matrix in which the particulate base is embedded. In embodiments, the step of consolidating the particulate mining waste comprises providing a fluid stream comprising the particulate mining waste; providing an activating material capable of being affixed to the particulate mining waste, wherein the activating material is an anionic or cationic polymer; affixing the activating material to the particulate mining waste in the fluid stream to form activated particles; providing anchor particles and providing a tethering material capable of being affixed to the anchor particles, wherein the tethering material is a polymer having an opposite charge than the activating material; attaching the tethering material to the anchor particles to form tether-bearing anchor particles; adding the tether-bearing anchor particles to the aqueous stream, wherein the tethering material attaches the tether-bearing anchor particles to the activated particles to form removable complexes in the aqueous stream; and removing the removable complexes from the fluid to consolidate the particulate mining waste to form the consolidated waste solid. The step of incorporating can comprise adding the controlled release base formulation to the fluid stream comprising the particulate mining waste prior to affixing the activating material to the particulate mine waste in the fluid stream. The step of incorporating can comprise adding the controlled release base formulation to the activating material prior to affixing the activating material to the particulate mine waste in the fluid stream. The step of incorporating can comprise adding the controlled release base formulation to the anchor particles prior to attaching the tethering material to the anchor particles to form tether-bearing anchor particles. The step of incorporating can comprise adding the controlled release base formulation to the tethering material, prior to attaching the tethering material to the anchor particles to form tether-bearing anchor particles.

Further disclosed herein, in embodiments, are consolidated waste solids, comprising a solid complex of activated particulate mining waste and tether-bearing anchor particles, a hydrophobizing material, and a controlled release base formulation, wherein the controlled release base formulation is sensitive to a decrease in pH in the solid complex. In embodiments, the controlled release base formulation comprises a particulate base and a controlled release system. The controlled release system can comprise a polymeric coating applied to the particulate base, or a polymeric matrix in which the particulate base is embedded.

DETAILED DESCRIPTION

Disclosed herein, in embodiments, are formulations and methods for treating mine tailings to prevent or decrease the incidence of acid mine drainage. It has been discovered that tailings can be efficiently managed using formulations and methods as disclosed in U.S. Pat. Nos. 8,353,641, 8,349,188, 8,557,123, and 8,945,394, the entire contents of which are incorporated herein by reference. According to these disclosures, fine particulate matter ("fines") can be removed from a waste tailing fluid by providing an activating material capable of being affixed to the particulate matter, affixing the activated material to the particulate matter to form activated particulate matter; providing an anchor particle and providing a tethering material capable of being affixed to the anchor particle; and attaching the tethering material to the anchor particle followed by attaching the tethering material to the activated particulate matter to form a removable complex in the fluid; wherein the fluid is a waste tailing fluid derived a mining process. These processes, using an activating material, a tethering material, and an anchor particle as described herein, are referred to as the "anchor-tether activator" processes, or "ATA" processes. As used herein, the term "activation" refers to the interaction of an activating material, such as a polymer, with suspended particles in a liquid medium, such as an aqueous solution. As used herein, the term "polymer" means the polymerization product of one or more monomers and is inclusive of homo-, co-, ter-, tetra-polymers, etc. and oligomeric polymers; "mer" or "mer unit" means that portion of a polymer derived from a single reactant molecule; "copolymer" means a polymer that includes mer units derived from two reactants (normally monomers) and is inclusive of random, block, segmented, graft, etc., copolymers; "oligomer" is a short-chain polymer. In embodiments, these polymeric structures can be functionalized, having one or more functional groups covalently linked thereto.

In embodiments, high molecular weight polymers can be introduced into the particulate dispersion to activate it, i.e., so that these polymers interact, or complex, with fine particles. The polymer-particle complexes interact with other similar complexes, or with other particles, and form agglomerates.

The "activation" step may be performed using flocculants or other polymeric substances. Preferably, the polymers or flocculants can be charged, including anionic or cationic polymers. In embodiments, anionic polymers can be used, including, for example, olefinic polymers, such as polymers made from polyacrylate, polymethacrylate, partially hydrolyzed polyacrylamide, and salts, esters and copolymers thereof (such as (sodium acrylate/acrylamide) copolymers), polyacrylic acid, polymethacrylic acid, sulfonated polymers, such as sulfonated polystyrene, and salts, esters and copolymers thereof, and the like. Suitable polycations include: polyvinylamines, polyallylamines, polydiallyldimethylammoniums (e.g., polydiallyldimethylammonium chloride, branched or linear polyethyleneimine, crosslinked amines (including epichlorohydrin-dimethylamine, and epichlorohydrin/alkylenediamines), quaternary ammonium substituted polymers, such as (acrylamide/dimethylaminoethylacrylate methyl chloride quat) copolymers and trimethylammoniumethylene-substituted polystyrene, polyvinylamine, and the like. Nonionic polymers suitable for hydrogen bonding interactions can include polyethylene oxide, polypropylene oxide, polyhydroxyethylacrylate, polyhydroxyethylmethacrylate, and the like. In embodiments, an activator such as polyethylene oxide can be used as an activator with a cationic tethering material in accordance with the description of tethering materials below.

Flocculants such as those sold under the trademark MAGNAFLOC® by Ciba Specialty Chemicals can be used as activator polymers. In embodiments, activators such as polymers or copolymers containing carboxylate, sulfonate, phosphonate, or hydroxamate groups can be used. These groups can be incorporated in the polymer as manufactured; alternatively, they can be produced by neutralization of the corresponding acid groups, or generated by hydrolysis of a precursor such as an ester, amide, anhydride, or nitrile group. The neutralization or hydrolysis step can be done on site prior to the point of use, or it can occur in situ in the process stream.

In embodiments, activator polymers with hydrophobic modifications can be used. As used herein, the term "hydrophobic" refers to a molecular entity that tends to be non-polar and, thus, prefers other neutral molecules and non-polar solvents. Examples of hydrophobic molecules include the alkanes, oils, fats, silanes, fluorocarbons, and the like. Polymers having hydrophobic modifications include polymers and copolymers formed by incorporating hydrophobic monomers in the polymeric chain. Examples of activator polymers with hydrophobic modifications can include PEO-PPO copolymers, hydrophobically modified polyacrylamide or polyacrylates, hydrophobically alkali-soluble emulsions (HASE) polymers, and the like.

As used herein, the term "tethering" refers to an interaction between an activated fine particle and an anchor particle (for example, as described below). The anchor particle can be treated or coated with a tethering material. The tethering material, such as a polymer, forms a complex or coating on the surface of the anchor particles such that the tether-bearing anchor particles have an affinity for the activated fines. In embodiments, the selection of tether and activator materials is intended to make the two solids streams complementary so that the activated fine particles become tethered, linked or otherwise attached to the anchor particle. When attached to activated fine particles via tethering, the anchor particles enhance the rate and completeness of sedimentation or removal of the fine particles from the fluid stream. In accordance with these methods, the tethering material acts as a complexing agent to affix the activated particles to an anchor material. In embodiments, a tethering material can be any type of material that interacts strongly with the activating material and that is connectable to an anchor particle.

As used herein, the term "anchor particle" refers to a particle that facilitates the separation of fine particles by the interaction between activated fine particles and the tethering mechanism described above. In embodiments, anchor particles have a density that is greater than the liquid process stream. Additionally or alternatively, the density of the anchor particles can be greater than the density of the fine particles or activated particles. Alternatively, the density is less than the dispersal medium, or density of the liquid or aqueous stream. Alternatively, the anchor particles are simply larger than the fine particles being removed. In embodiments, the anchor particles are chosen so that, after complexing with the fine particulate matter via the tethering mechanism, the resulting complexes can be removed via a skimming process rather than a settling-out process, or they can be readily filtered out or otherwise skimmed off. Suitable anchor particles can be formed from organic or inorganic materials, or any mixture thereof. Particles suitable for use as anchor particles can include organic or inorganic particles, or mixtures thereof. In referring to an anchor particle, it is understood that such a particle can be made from a single substance or can be made from a composite.

As an example of a tethering material used with an anchor particle in accordance with these systems and methods, chitosan can be precipitated onto anchor particles, for example, via pH-switching behavior. The chitosan as a tether can have affinity for anionic systems that have been used to activate fine particles. In one example, partially hydrolyzed polyacrylamide polymers can be used to activate the fine particles (e.g., coal fines, or fines produced during metal mining), resulting in a particle with anionic charge properties. The cationic charge of the chitosan will attract the anionic charge of the activated particles, to attach the anchor particles to the activated fines, e.g. coal fines, or fines produced during metal mining. In the foregoing example, electrostatic interactions can govern the assembly of the activated fine particle complexes bearing the anionic partially-hydrolyzed polyacrylamide polymer and the cationic anchor particles complexed with the chitosan tethering material. In embodiments, polymers such as linear or branched polyethyleneimine can be used as tethering materials. It would be understood that other anionic or cationic polymers can be used as tethering agents, for example polydiallyldimethylammonium chloride (poly(DADMAC)). In other embodiments, cationic tethering agents such as epichlorohydrin dimethylamine (epi/DMA), styrene maleic anhydride imide (SMAI), polyethylene imide (PEI), polyvinylamine, polyallylamine, amine-aldehyde condensates, poly(dimethylaminoethyl acrylate methyl chloride quaternary) polymers and the like can be used. Advantageously, cationic polymers useful as tethering agents can include quaternary ammonium or phosphonium groups. Advantageously, polymers with quaternary ammonium groups such as polydiallyldimethylammonium chloride (poly (DADMAC)) or epi/DMA can be used as tethering agents. In other embodiments, polyvalent metal salts (e.g., calcium, magnesium, aluminum, iron salts, and the like) can be used as tethering agents. In other embodiments cationic surfactants such as dimethyldialkyl(C8-C22) ammonium halides, alkyl(C8-22) trimethylammonium halides, alkyl(C8-C22) dimethyl benzyl ammonium halides, cetyl pyridinium chloride, fatty amines, protonated or quaternized fatty amines, fatty amides and alkyl phosphonium compounds can be used as tethering agents. In embodiments, polymers such as linear or branched polyethyleneimine can be used as tethering materials. In embodiments, polymers having hydrophobic modifications can be used as tethering agents, for example, PEO-PPO copolymers, hydrophobically modified polyacrylamide or polyacrylates, hydrophobically alkali-soluble emulsions (HASE) polymers, and the like. It would be understood that other anionic or cationic polymers can be used as tethering agents, for example polydiallyldimethylammonium chloride. The efficacy of a tethering material, however, can depend on the activating material. A high affinity between the tethering material and the activating material can lead to a strong and/or rapid interaction therebetween. A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In hydrogen bonding terms, a hydrogen bond donor should be used in conjunction with a hydrogen bond acceptor. In embodiments, the tether material can be complimentary to the chosen activator, and both materials can possess a strong affinity to their respective deposition surfaces while retaining this surface property. In other embodiments, cationic-anionic interactions can be arranged between activated fine particles and tether-bearing anchor particles. The activator may be a cationic or an anionic material, as long as it has an affinity for the fine particles to which it attaches.

In embodiments, the systems and methods disclosed herein can be adapted to and optimized for the needs of a specific mining industry for treatment of particulate suspensions in fluid streams of waste products. The processes described herein can be utilized to sequester and suspend fines and pollutants from waste tailings. The technology can be used for the treatment of waste slurry as it is generated. Mining endeavors producing wastes and waste fluids include, but are not limited to, processing and beneficiation of ores such as iron, bauxite, phosphate, taconite, kaolin, trona, potash and the like. When applied to mining tailings, the ATA processes can agglomerate the fine waste particles in the tailings stream (the "fines") into a cohesive solid mass, while dewatering efficiently. The end result of ATA treatment of the tailings stream is a dry, stackable solid mass that is separated from the aqueous medium that had carried the tailings originally.

In embodiments, these ATA tailings treatments can be combined with a neutralization process to address the problem of AMD. In embodiments, a controlled-release base formulation can be added to the tailings stream, or it can be incorporated into the ATA process as an anchor particle. Controlled-release base formulations can be formed as coated particles with an exterior controlled-release coating, or as controlled release matrices bearing base materials within the matrix.

Polymers that are advantageous for providing controlled release functionality to the base formulations disclosed herein can include polyethylene oxides, hydroxypropyl methylcellulose, polymethyl methacrylate, polyvinyl alcohol, polylactic acid, and the like. Polymers suitable as controlled release agents (either as coatings or matrices) for the base formulations as disclosed herein are advantageously able to swell and/or absorb water to protect the constitutive base particles from becoming wetted or dissolved. Advantageously, the polymers can be hydrolyzed or otherwise degraded under acidic conditions. For those controlled-release base formulations where the constitutive base particles are coated with the controlled release polymers onsite, it would be advantageous for the polymers to be at least partially soluble in water, relatively high in molecular weight, and neutral to slightly anionic in charge.

Bases that are advantageous for neutralizing the tailings and/or for decreasing the acidity of drainage from the tailings can include basic materials such as sodium hydroxide, calcium hydroxide, calcium oxide, calcium carbonate, magnesium hydroxide, sodium carbonate, and the like. While the aforesaid bases are suitable exemplars, it would be understood by those of ordinary skill in the art that any appropriate base material can be used, recognizing the importance of cost and environmental considerations. Bases suitable for base formulations as disclosed herein can be any base so long as it effectively neutralizes the acid formed by the tailings. For example, basic materials such potassium hydroxide, sodium bicarbonate, ammonium hydroxide, calcium silicate, and the like can be used. In embodiments, the cation associated with the base is an environmentally benign or well-tolerated material.

As an example, the formulations and methods disclosed herein can be used to treat the AMD that forms when sulfide minerals in mine tailings are exposed to oxidizing conditions to form acidic and sulfate-rich drainage. As sulfuric acid is produced within the tailings, the pH levels will drop due to acid formation. Controlled-release base formulations can be engineered as described below, so that they are responsive to certain pH levels to release the encapsulated or embedded base.

Advantageously, the controlled-release base formulation for use with the ATA processes can be provided in a form that is insoluble until a change in pH occurs that indicates the production of AMD. A controlled release formulation can comprise a controlled-release matrix that dissolves upon change in pH, or it can be coated with a controlled-release coating that dissolves upon change of pH. As examples, controlled-release matrices or coatings can be formed that comprise cationic polymers with amino groups, such as aminoalkyl methacrylate copolymer, polyvinyl acetal diethylaminoacetate polymer, and the like; such polymers are known to be responsive to low pH. Polymers containing acrylic acid, methacrylic acid, maleic anhydride, and N,N-dimethylaminoethyl methacrylate, and phosphoric acid derivatives can also be used.

Whether a controlled-release formulation is used, it will dissolve as the pH decreases, allowing the base itself to come into contact with the acid, thereby neutralizing it. The coating can be engineered so that only some of the base is released with the initial pH drop; once the pH stabilizes with acid neutralization, the remaining coating protects the base from further exposure to the acid. If more acid is produced, resulting in a subsequent pH drop below the trigger level, the coating dissolves further so that more base is available for neutralization.

In other embodiments, the ATA tailings treatment can be combined with a neutralization process using a base embedded in a controlled-release matrix to address the problem of AMD. The controlled-release matrix surrounding the embedded base can be engineered to dissolve at a trigger pH so that the base is released gradually into contact with acid that has been produced. As neutralization proceeds and the pH rises above the trigger level, the controlled-release matrix will retain its integrity, preventing further release of the base. Subsequently, if more acid is produced, the controlled-release matrix will again begin to dissolve and release the embedded base.

The use of a controlled-release coating or matrix as described above can allow the pH in the tailings to be maintained above levels that are hazardous to the environment. For example, pH below 5 can be toxic to aquatic life, and further acid production can occur at pH levels between 2 and 3 due to the presence of acidophilic bacteria. Furthermore, when pH levels drop below 3.5 and then rise, significant metal precipitation can occur into the environment. If the availability of a controlled-release base formulation prevents the pH levels from dropping below this threshold for precipitation, this complication can be prevented.

While addition of a controlled-release base formulation to the tailings stream can yield desirable neutralization, combining the controlled-release base formulation with the ATA tailings treatment offers additional advantages. The ATA treatment consolidates the tailings stream solids into a cohesive dewatered mass, so that the ATA-treated tailings contain less water; with less water, there will be less acid seepage. Furthermore, by selecting appropriate controlled-release base formulations, additional solidification can be obtained. For example, adding a base such as calcium carbonate to the sulfuric acid in the AMD produces calcium sulfate, also known as gypsum. An ATA-derived composite comprising gypsum is stronger and more cohesive than either tailings containing gypsum without ATA solidification, or ATA-treated tailings without gypsum.

In certain embodiments, the controlled-release base formulation can be used as an anchor particle during the ATA process. In other embodiments, the controlled-release base formulation can be added to the ATA process during tailings treatment, where anchor particles are provided through the separation of the effluent fluid stream into an underflow bearing coarse particles (suitable for anchor particles) and an overflow bearing the fine particles or fines that are treated with the activator. The controlled-release base formulation may be added in during many different points of the ATA treatment. It can be mixed in with the fine tailings before the activator solution is added, or mixed with the activator polymer before its addition to the fine tailings, or mixed with the coarse tailings before the tether solution is added, or mixed with the tether polymer before its addition to the coarse tailings.

In addition to this process for treating AMD by combining the controlled-release base formulation with the ATA tailings treatment, a hydrophobizing step can be included as part of the ATA process, which would render the final ATA solid more hydrophobic. As used herein, the term "hydrophobization" means to render a substrate, a process, etc., hydrophobic. The terms "hydrophobization" and "hydrophobicization," and the terms "hydrophobizing material" and "hydrophobicizing material" are used interchangeably. This step can be included as disclosed in U.S. Provisional Patent Application Ser. No. 62/346,860, filed Jun. 7, 2016, the contents of which are incorporated herein by reference.

Modifications to improve the hydrophobicity of ATA solids can involve the addition of hydrophobizing materials during the ATA process. Hydrophobizing materials can include hydrophobic substrates to be used for or with anchor particles, or hydrophobizing substances to be added during any step of the ATA process. Hydrophobizing materials can comprise hydrophobic small molecules or hydrophobic polymers. Examples of suitable hydrophobizing molecules include fatty acids and fatty acid salts. As used herein, the term "fatty acid" refers to a carboxylic acid having a hydrocarbon chain of 4 to 36 carbons, where the chain can be fully saturated and unbranched, or where there can be one or more points of unsaturation, optionally bearing other functional groups including three-carbon rings or hydroxyl group. Exemplary fatty acids useful for hydrophobic modification of particles include fatty acids (and their salts) such as stearic acid, sodium stearate, oleic acid, sodium oleate, lauric acid, sodium laurate, and the like. Additionally, fatty amines, surfactants, detergents, ethoxylated surfactants, nonionic surfactants, and the like, can be used.

In other embodiments, a variety of hydrophobic polymers and copolymers can be used, including those comprising hydrophobic acrylics, amides and imides, carbonates, dienes, esters, ethers, fluorocarbons, olefins, styrenes, vinyl acetals, vinyl and vinylidine chlorides, vinyl ethers and ketones, vinylpyridine and vinlypyrrolidone, and the like Examples of suitable hydrophobic polymers include, by way of example and not of limitation, those polymers that are formed by polymerization of α,β-ethylenically unsaturated monomers or olefinic polymerization. Polymers obtained by polymerization of α,β-ethylenically unsaturated monomers include but are not limited to polymers and copolymers obtained from polymerizable amide compounds including acrylamide, N-(1,1-Dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6) acrylamide and 1-(N,N-dimethylamino)-ethyl-(2)-methacrylamide, 1-(N,N,dimetnylamino)-propyl-(3)-acrylamide and 1-(N,N-dimethylamino)-hexyl-(6)-methacrylamide; polymerizable nitriles such as acrylonitrile and methacrylonitrile; polyalkylene glycol acrylates and methacrylates such polyethylene glycol substituted acrylate and methacrylate; alkyl acrylates or alkyl methacrylates such as methyl acrylate, methyl methacrylate, ethyl acrylate, ethyl methacrylate, n-butyl acrylate, n-butyl methacrylate, 2-ethylhexyl acrylate, cyclohexyl methacrylate, 2-ethylhexyl methacrylate, isobornyl methacrylate, stearyl methacrylate, sulfoethyl methacrylate and lauryl methacrylate; polymerizable aromatic compounds including styrene, α-methyl styrene, vinyl toluene, t-butyl styrene; α-olefin compounds such as ethylene, propylene; vinyl compounds such as vinyl acetate, vinyl propionate, vinyl ethers, vinyl and vinylidene halides, diene compounds such as butadiene and isoprene. Other hydrophobic polymers can be formed to include fluorine or silicon atoms. Examples of these include 1H, 1H, 5H-octafluoropentyl acrylate, and trimethylsiloxyethyl acrylate. Other hydrophobic polymers include polyalkylene homopolymers, polyalkylene copolymers or polyalkylene block copolymers. Such compounds can be polymerized from olefins selected from the group consisting of ethylene, propylene, butylene, and mixtures thereof. By way of example and not of limitation, exemplary hydrophobic polymers can include polyacetals, polyolefins, polycarbonates, polystyrenes, polyesters, polyamides, polyamide-imides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalimides, polyanhydrides, polyvinyl ethers, polyvinyl thioethers, polyvinyl ketones, polyvinyl halides, polyvinyl nitriles, polyvinyl esters, polysulfonates, polysulfides, polythioesters, polysulfonamides, polyureas, polyphosphazenes, polysilazanes, polyethylene terephthalate, polybutylene terephthalate, polyurethane, polytetrafluoroethylene, polychlorotrifluoroethylene, polyvinylidene fluoride, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, and polysiloxanes, or combinations thereof.

Hydrophobizing substances can be added to the fines directly to create more hydrophobic fines for subsequent activation. Hydrophobizing substances can be added as part of the activation step, with hydrophobic polymers being used as main activators, or as adjuncts to activators. Hydrophobizing substances can be added after activation takes place, so that the activated fines are rendered more hydrophobic. Hydrophobizing substances can be added to the anchor particles milieu, for example as part of the coarse solids slurry that provides the anchor particles. Certain hydrophobizing substances can be used as tether polymers or as adjuncts to the tethering process. Hydrophobizing substances can be added after the tethering takes place, so that the tether-bearing anchor particles are rendered more hydrophobic. Hydrophobizing materials can be added to the ATA solids that are formed after the consolidation of the activated fines and the tether-bearing anchor particles, so that the final solids become and/or remain more hydrophobic. Any of these hydrophobizing steps can be undertaken alone or in combination with the others. As would be understood by those of ordinary skill in the art, a variety of hydrophobizing materials are available, and are suitable for these purposes If a hydrophobizing material has been applied either to the fines side of the process or to the anchor particles side of the process, when the activated, insoluble fines come into contact with the tether-bearing anchor particles, the resultant ATA solids will incorporate hydrophobic properties. Such ATA solids can be termed a "hydrophobized composite." As the hydrophobic solids flocculate and drain, more water will be removed than in traditional ATA or other dewatering processes. Once ATA solids are used in the desired application, a hydrophobic material can be applied at desired intervals of time for an initial application, or reapplication, of a hydrophobic coating.

With the addition of a hydrophobizing material, the ATA solid would be more resistant to moisture, so that any acidic substances or acid-producing moieties entrained therein would be shielded from release into the environment. In certain embodiments, using the hydrophobic ATA process alone can decrease or even eliminate the requirement for the controlled release base formulation, because the acidic components of the ATA solid would be protected from water contact so would remain trapped within the solid material. In other embodiments, a hydrophobizing step can be added to the ATA process in combination with the use of the controlled release base formulation.

In embodiments, particles can be used to introduce hydrophobic properties to the ATA process. Particles that are intrinsically hydrophobic, or that are hydrophobized by exposure to a hydrophobizing material, can be added to the fines stream or the anchor particles stream or both, to make the specified stream more hydrophobic. Hydrophobic particles can be used as additives to the selected stream to increase its hydrophobicity and the hydrophobicity of the resultant ATA solid. Hydrophobic particles can also be used as anchor particles, to be coated with a tethering polymer with or without additional hydrophobization, to increase the hydrophobicity of that stream and the hydrophobicity of the resultant ATA solid.

In an embodiment, intrinsically hydrophobic particles can be used as anchor particles or as adjuncts to the ATA system to be embedded in the consolidated ATA solid mass. For example, plastic materials may be used as hydrophobic particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include polyether polyurethanes and polyester polyurethanes. Plastics may also be obtained for these uses from waste plastic, such as post-consumer waste including plastic bags, containers, bottles made of high density polyethylene, polyethylene grocery store bags, and the like. In embodiments, elastomeric materials can be used as particles. Particles of natural or synthetic rubber can be used, for example.

In embodiments, a particle with or without intrinsic hydrophobicity can be made hydrophobic and used to increase the hydrophobicity of the ATA solid. In embodiments, the substrate particle for hydrophobic modification can include any organic or inorganic particles, or mixtures thereof, modified to increase their hydrophobicity. The substrate particles can be modified prior to introduction into the process, at the point of injection, or after injection. The hydrophobically modified particles can be added either to the activation side of the process or the tether-bearing anchor particles side of the process. Incorporation of the hydrophobically modified particles within the final ATA solid will lead to a more hydrophobic final product, which will consolidate more quickly because it repels water, and it will produce more efficient water retrieval. Moreover, the final ATA solid will be more resistant to subsequent water incursion, a property that can be improved by additional treatment of the final ATA solid with a hydrophobizing material.

A wide range of hydrophobizing substances, as described above, would be suitable for hydrophobic modification of particles. In embodiments, for example, a particle such as precipitated calcium carbonate (PCC) can be coated with a hydrophobizing agent as disclosed above, thereby creating hydrophobically modified PCC particles. For example, fatty acids or fatty acid salts (e.g., stearic acid, sodium stearate, oleic acid, sodium oleate, lauric acid, sodium laurate, and the like) can be used to coat particles such as PCC particles to create hydrophobically modified PCC particles. In embodiments, these hydrophobically modified PCC particles can be used as anchor particles, to be complexed with an appropriate tethering agent. In other embodiments, these hydrophobically modified PCC particles can be used in conjunction with other anchor particles, all of which can be combined with appropriate tethering polymers to form a composite set of tether-bearing anchor particles. In yet other embodiments, the hydrophobically modified PCC particles can be added to the fine particulates, either before or after their activation, thus rendering the fine particulate dispersion more hydrophobic. When the tether-bearing anchor particles are added to this hydrophobized activated fine particulate dispersion, an ATA solid will form that has hydrophobic properties.

In embodiments, any organic or inorganic particle can be used as a substrate particle for hydrophobizing. For example, the materials mentioned above for use as anchor particles may provide suitable substrates for hydrophobizing.

Adding hydrophobic particles to either the fines or coarse stream can allow for a controlled release of acid neutralizing species. In addition to limiting the acid producing potential of the resultant solids by reducing the inherent moisture content, the hydrophobic coating can slowly degrade via hydrolysis. As the hydrophobic coating degrades, the underlying particles can become exposed to the surrounding environment and neutralize any produced acid. For example, hydrophobically modified PCC can be used in this manner. The hydrophobic coating can be designed to degrade under acidic conditions. Further, the hydrophobic coating on particles such as PCC can be tuned so that the coating and/or the underlying particle can release acid neutralizing species at a controlled rate regardless of the pH of the environment. Such tuning can occur through the selection of a suitable polymer for the hydrophobic coating, for example a biodegradable polymer. In the context of acid mine drainage, the acidic mine water (a solvent) can penetrate the polymer and degrade it over time. An appropriate polymer would be one susceptible to hydrolysis, such as poly(lactic acid) poly (caprolactone), poly(phosphoesters), poly(anhydride), poly (orthoesters), poly(phosphazenes), and poly(cyanoacrylates) polymers and copolymers. The coating composition and thickness would be engineered to last a certain amount of time when exposed to acidic conditions.

The anchor particles for use in the ATA process can be obtained from sources external to the mine site, or they can be indigenous to the mine site, for example sand or particulate waste material left over from the mining operation. In embodiments, the anchor particles can be derived from the actual process of extracting minerals from ores, as illustrated in FIGS. 1-4. Extraction of minerals from ores produces fine, positively charged particles of clay or other materials (the tailings) that remain suspended in the effluent fluid stream. The effluent fluid stream can be directed to a mechanical separator such as a cyclone that can separate the fluid stream into two components, an overflow fluid comprising fine tails that contains the particles (typically, particles between about 0.1 to about 150 microns in diameter), and an underflow fluid stream that contains coarse tails, mainly sand, with a small amount of fine clay particles.

In embodiments, the systems and methods disclosed herein can treat each fluid stream, an overflow fluid and/or an underflow fluid. An activating agent, such as a polyanion as described above, can preferably be introduced into the overflow fluid stream, resulting in a flocculation of the fine particles therein, often forming a soft, spongy mass. Separately, the underflow fluid can be used for the preparation of tether-bearing anchor particles. In certain tailings fluids, the sand or other solid material within the underflow fluid itself can act as an "anchor particle," as described above. A cationic tethering agent, as described above, can be introduced into the underflow fluid so that it self-assembles onto the surface of the anchor particles, creating a plurality of tether-bearing anchor particles. Following this treatment to each fluid stream, the two fluid streams can be re-mixed in a batch, semi-batch or continuous fashion. The tether-bearing anchor particles can interact, preferably electrostatically, with the activated, preferably flocculating, fine particles, forming large agglomerations of solid material that can be readily removed from or settled in the resulting fluid mixture. In embodiments, the aforesaid systems and methods are amenable to incorporation within existing tailings separation systems. For example, a treatment process can be added inline to each of the separate flows from the overflow and underflow fluids; treated fluids then re-converge to form a single fluid path from which the resulting agglomerations can be removed. Removal of the agglomerations can take place, for example, by filtration, centrifugation, or other type of mechanical separation.

Various options for adding the controlled-release base formulation to the ATA process are illustrated in the following Figures. In embodiments, the controlled-release base formulation can be formed as particles that act mechanically in ways similar to the solids in the stream where they are added: if controlled-release base formulation is added to the fines or the activator stream, it will behave as fine particles, and if controlled-release base formulation is added to the coarse or the tether stream, it will behave as coarse or anchor particles. Under these circumstances, activator or tether polymer amounts may need to be adjusted, or the amount of polymer coating or matrix for the controlled-release base formulation may need to be adjusted.

Figure 1:
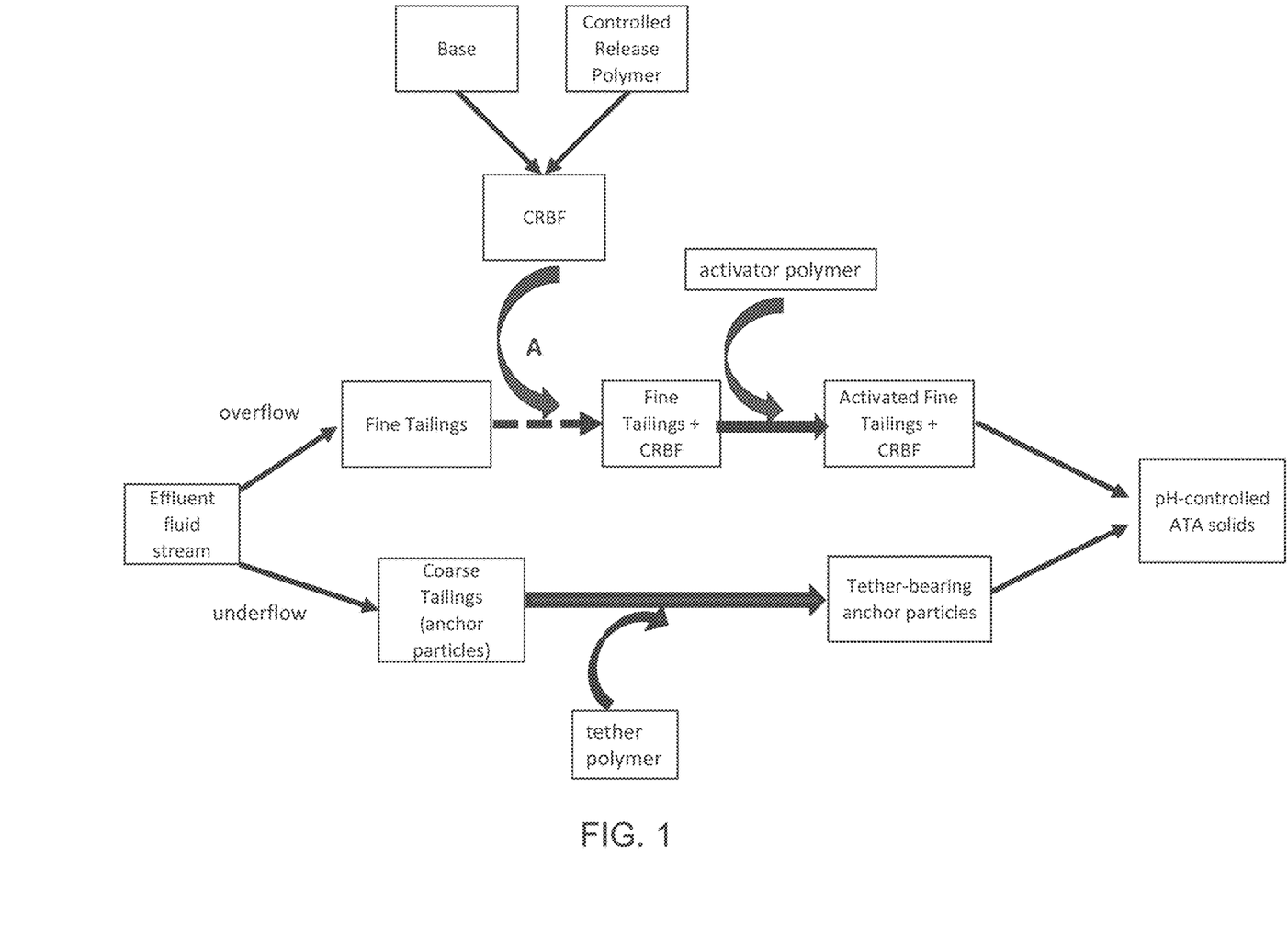
FIG. 1 is a block diagram of an anchor-tether-activator (ATA) process, showing an addition point A of a controlled release base formulation.

As shown in FIG. 1, controlled-release base formulation ("CRBF") can be added to fine tailings before the activator solution is added thereto, with this addition point shown by Point A. As shown in this Figure, CRBF can be prepared in advance or on site by combining the solid particulate base with an appropriate controlled-release polymer, either to form a coated particulate base or controlled-release matrix for delivering the base at an appropriate acidic pH. The activator polymer (as described above) can then be added to the fine tailings suspension that contains the CRBF. Separately, the tether polymers can be combined with the anchor particles to form tethered anchors, i.e., tether-bearing anchor particles. The tether-bearing anchor particles can then be added to the suspension containing the activated fines and CRBF to form agglomerated anchor-tether-activator complexes which are pH-controlled solids.

Figure 2:
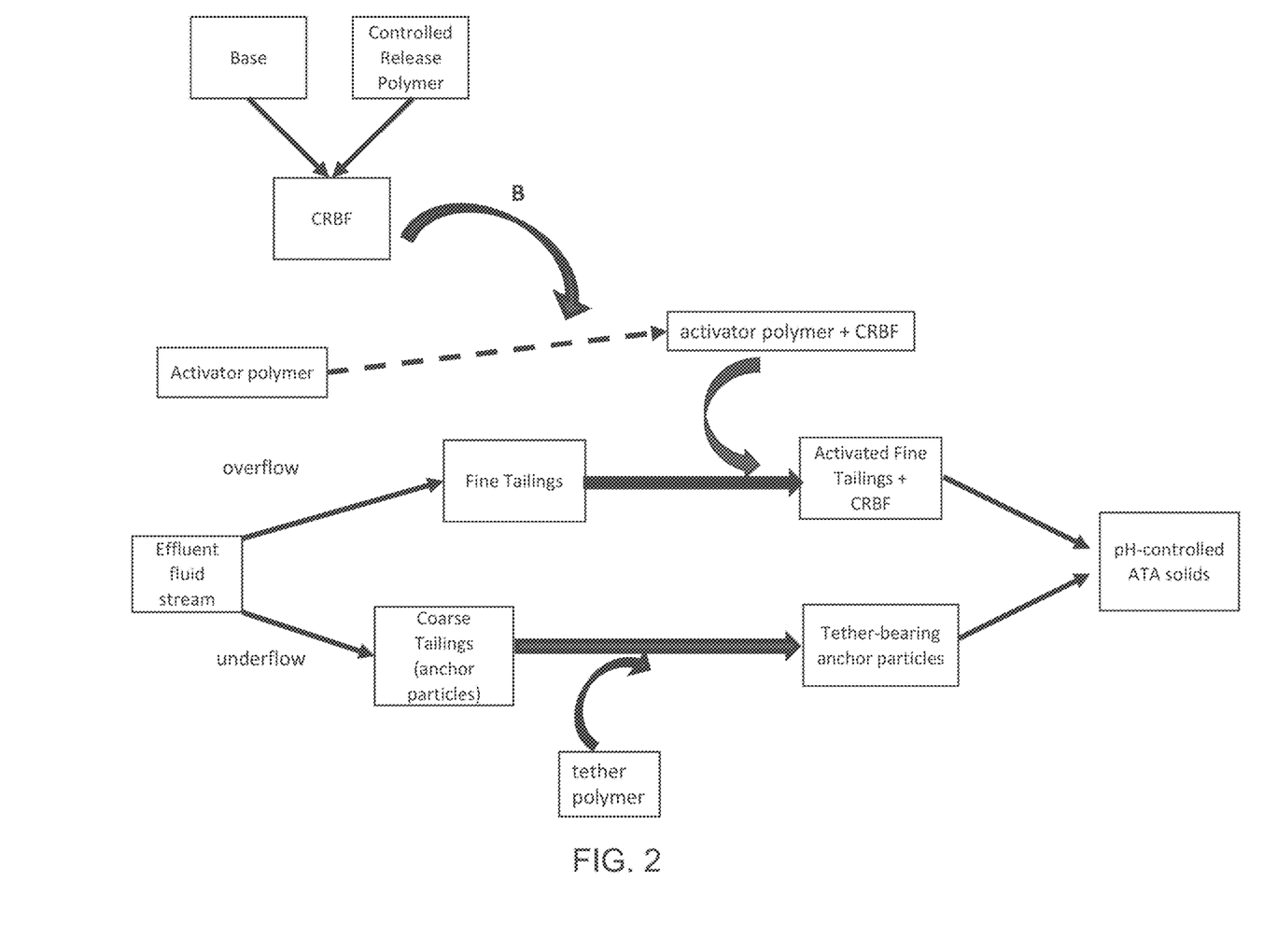
FIG. 2 is a block diagram of an anchor-tether-activator (ATA) process, showing an addition point B of a controlled release base formulation.

FIG. 2 illustrates a different entry point for the CRBF into the ATA system. As depicted in FIG. 2, the CRBF can be added to the activator polymer, with the addition point shown by Point B. The activator polymer/CRBF mixture can then be added to the fine tailings suspension to produce activated fine tailings plus CRBF, which in turn can be combined with the tether-bearing anchor particles to yield the pH-controlled ATA solids.

Figure 3:
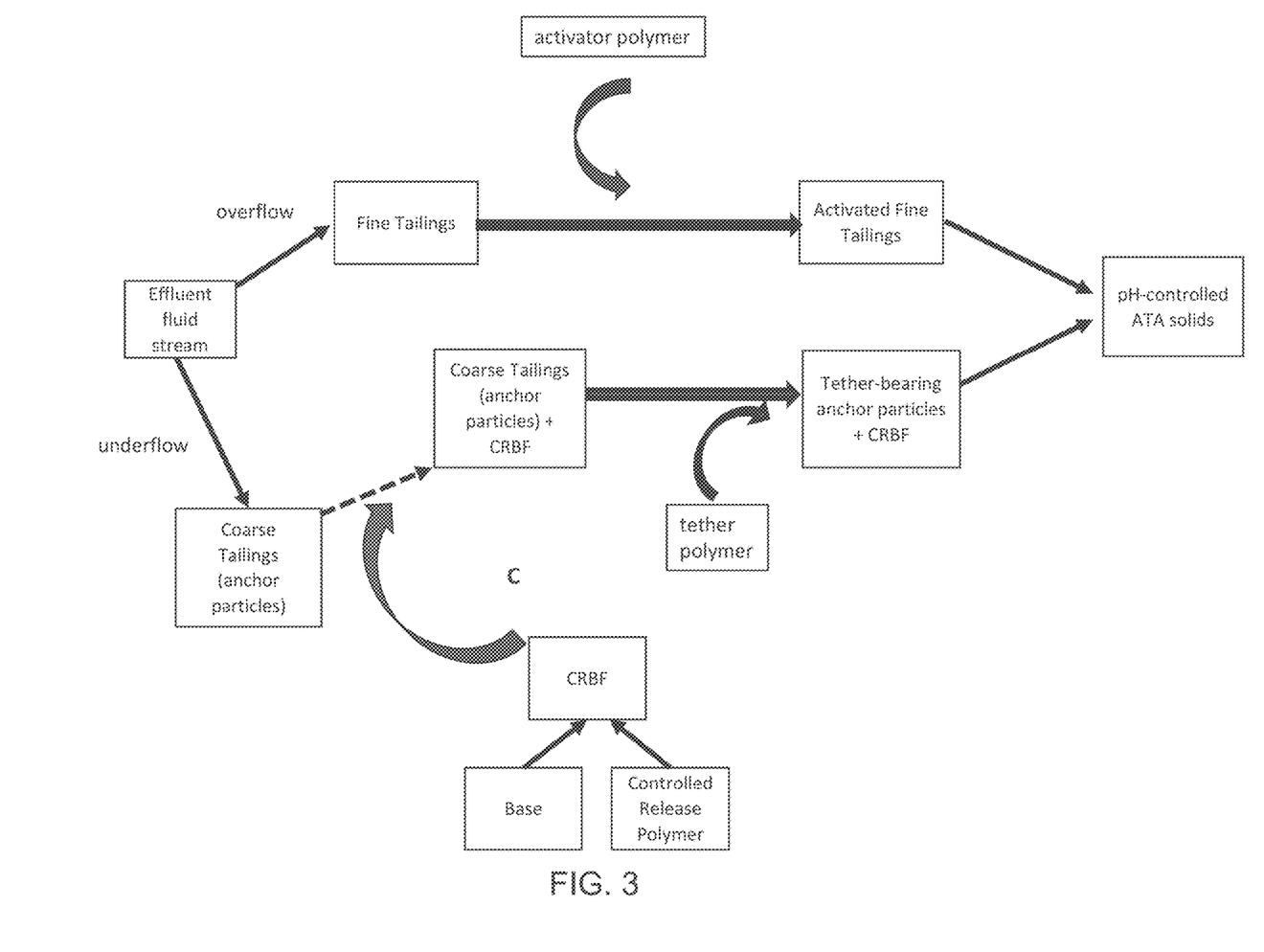
FIG. 3 is a block diagram of an anchor-tether-activator (ATA) process, showing an addition point C of a controlled release base formulation.

FIG. 3 illustrates another different entry point for the CRBF into the ATA system. As depicted in FIG. 3, the CRBF can be added to the anchor particles directly, e.g., to the coarse tailings separated out as underflow, with the addition point shown by Point C. The anchor particles/CRBF mixture can then be combined with the tether polymer, to provide tether-bearing anchor particles interspersed with the CRBF material. The tether-bearing anchor particles/CRBF material can be combined with the activated fine tailings to yield the pH-controlled ATA solids.

Figure 4:
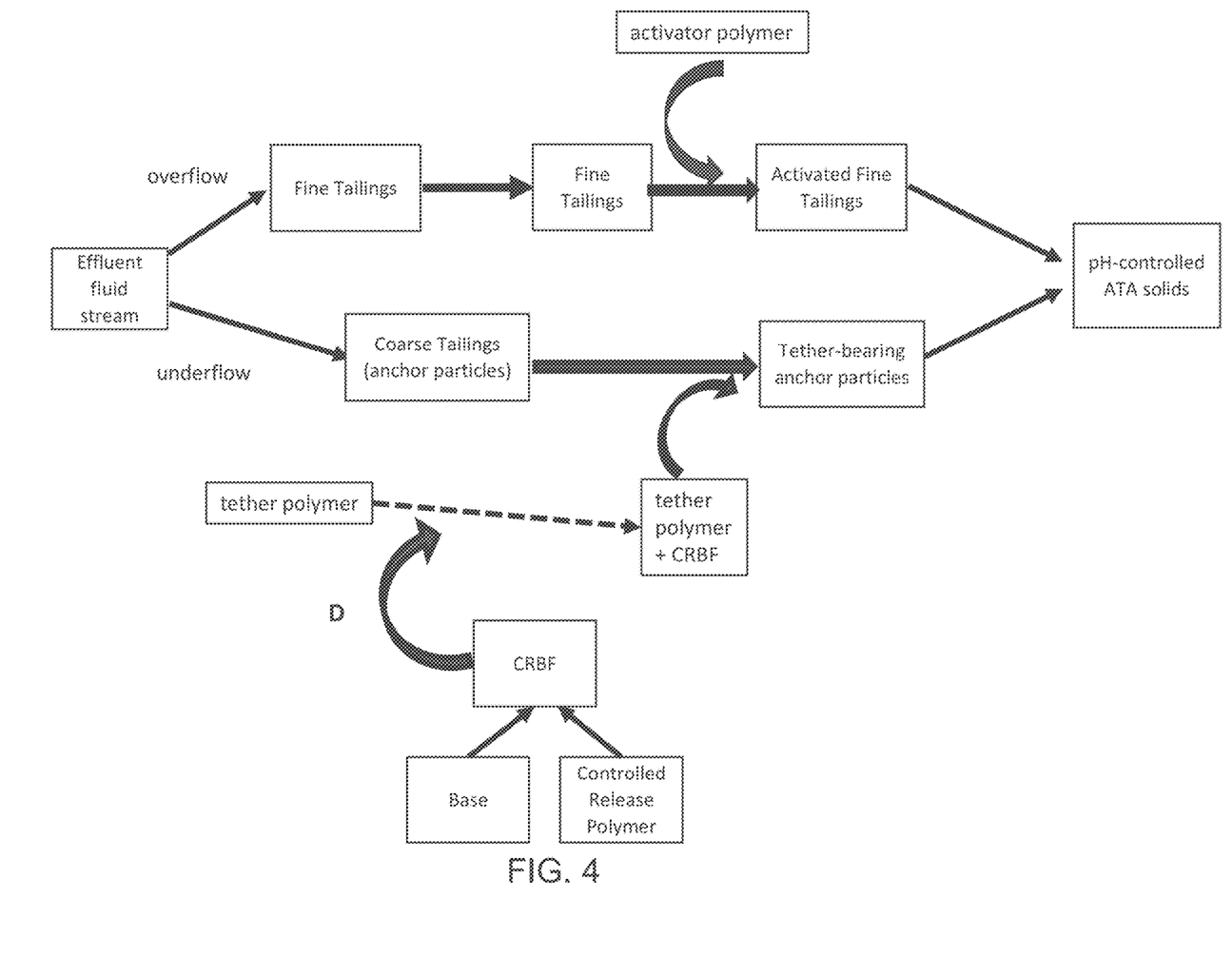
FIG. 4 is a block diagram of an anchor-tether-activator (ATA) process, showing an addition point D of a controlled release base formulation.

FIG. 4 illustrates another different entry point for the CRBF into the ATA system. As depicted in FIG. 4, the CRBF can be added to the tether polymer, with the addition point shown by Point D. The tether polymer/CRBF mixture can then be added to the anchor particles (e.g., coarse tailings), which in turn can be combined with the activated fine tailings to yield the pH-controlled ATA solids.

Figure 5:
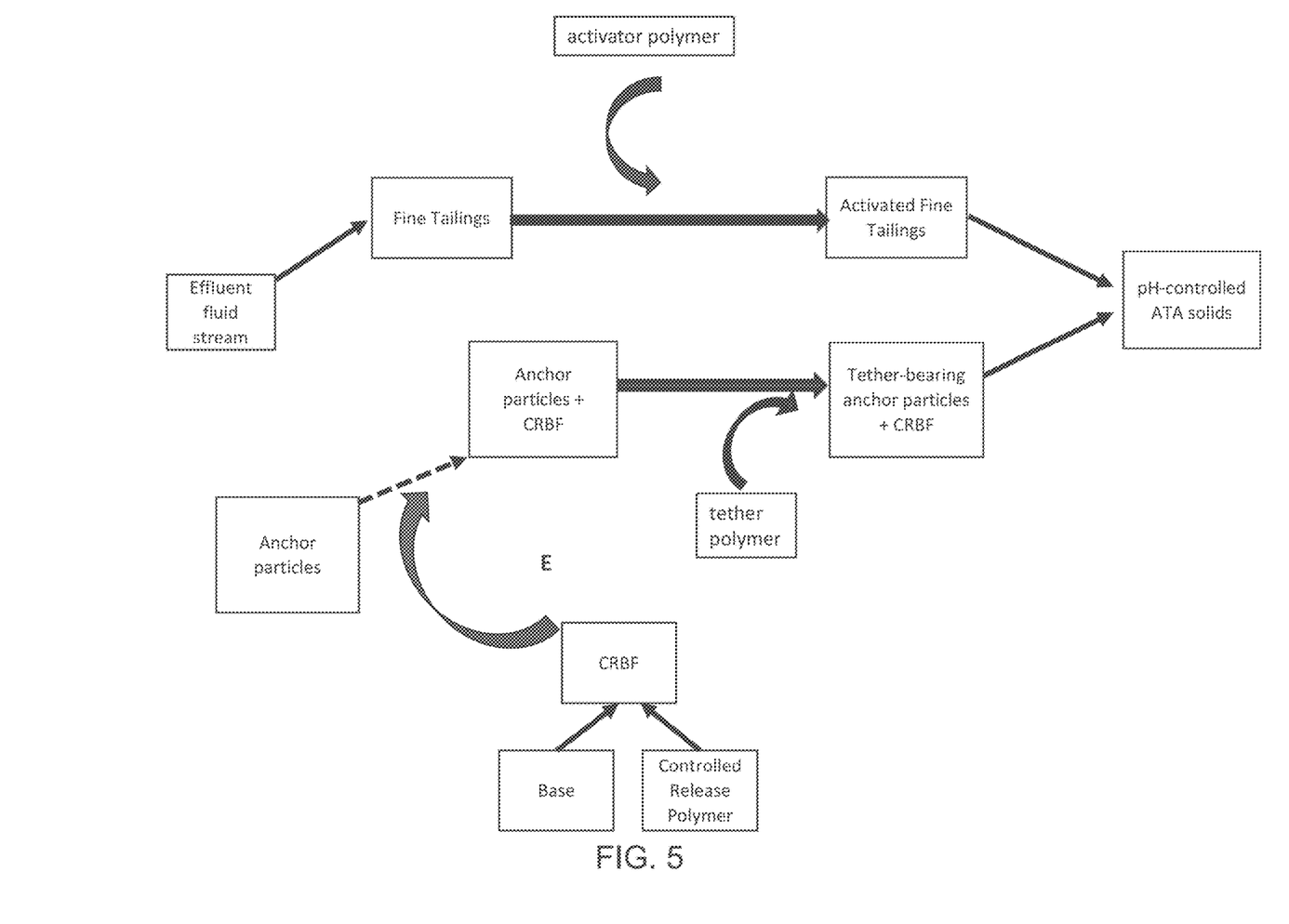
FIG. 5 is a block diagram of an anchor-tether-activator (ATA) process, showing an addition point E of a controlled release base formulation.

FIG. 5 illustrates a variation on the ATA process, where the anchor particles are not derived from the underflow of the effluent fluid stream. Instead, the anchor particles are provided separately, and are then combined with CRBF as shown by Point E. The mixture of anchor particles and CRBF are treated with the tether polymer to form tether-bearing anchor particles and tether-bearing CRBF, which can then be combined with the activated fine tailings to yield the pH-controlled solids. The amount of CRBF that is combined with the anchor particles can be adjusted in order to produce the desired amount of neutralization or potential neutralization in the pH-controlled ATA solids. In embodiments, the CRBF itself can be used as anchor particles, alone or in combination with other anchor particle materials as previously described.

EXAMPLES

Example 1

An experiment on samples from a pyrite mine can be conducted to understand the impact of combining the anchor-tether-activator ("ATA") process with controlled-release base formulation products ("ATA-AMD treatment") on preventing acid mine drainage. In an experiment as described below, both a control and an experimental material can be tested. The control material can consist of ATA-treated solids that do not contain any controlled-release base formulation ("CRBF") particles, and the experimental material can consist of ATA-AMD-treated solids that contain CRBF particles. A final test can be performed on untreated tailings.

Method

The control material (the "Control") is prepared by introducing 500 ppm of activator polymer into a predetermined amount of fine tailings. The activator polymer can be an anionic polymer such as polyacrylamide, or other anionic polymers such as olefinic polymers, polymers made from polyacrylate, polymethacrylate, partially hydrolyzed polyacrylamide, and salts, esters and copolymers thereof (such as sodium acrylate/acrylamide) copolymers, polyacrylic acid, polymethacrylic acid, sulfonated polymers, such as sulfonated polystyrene, and salts, esters and copolymers thereof, and the like. The fine tailings are mixed by inverting the container six times. Separately, a predetermined amount of coarse tailings is treated with 250 ppm of tether polymer, which can be a cationic polymer such as polyDADMAC, or other cationic polymers such as epichlorohydrin dimethylamine (epi/DMA), styrene maleic anhydride imide (SMAI), polyethylene imide (PEI), polyvinylamine, polyallylamine, amine-aldehyde condensates, poly(dimethylaminoethyl acrylate methyl chloride quaternary) polymers and the like, and is mixed for a few seconds. Both polymer solutions are created using a 0.1% solution of the respective polymer active in water. The activated fines are added to the tether-bearing coarse material, and the container can be inverted six times. After letting it settle, the water is drained out, and the resulting solids are pressed between paper towels to allow them to dewater further.

The experimental material is prepared in a similar manner to the Control, but separately an initial time release blend is created which contains $CaCO_3$ and polyvinyl alcohol. The amount of $CaCO_3$ used is 1.6 wt % of the amount of solids it is treating. An aqueous solution of PVA of 10 wt % is created, and the $CaCO_3$ is mixed in. This mixture is then centrifuged at 100 g, so that the water can separate out, thereby forming CRBF particles. These CRBF particles are added to the tether polymer solution before the tether solution is added to the coarse tailings. The fine tailings, mixing processes, filtration, and drying are otherwise the same as explained for the control solution.

As part of the experiment to simulate acid mine drainage, 20 grams of control material is placed in a container with multiple ports for tubing to be connected. The apparatus is attached to an air source to allow dry air to be pumped into the system containing the control product at 80 mL/min for one hour. A Liebig condenser is used to pump humid air into the system at the same rate for one hour. Approximately 20 mL of deionized water with a pH of 7 is pumped into the system. This is done using a peristaltic pump that is connected to the apparatus to pump water in and out. The water is introduced to the system and is allowed to sit for 5 minutes before being removed. This fluctuation of dry air, humid, air, and water closely mimics the constant wetting and drying of the ore.

The pH of the water removed from the system is measured, and the water is discarded. The cycle of 1 hour of dry air, 1 hour of humid air, and 5 minutes of fresh deionized water is repeated four additional times. The entire experiment, with five rounds of dry air, humid air, and water is repeated with both the experimental material and the untreated tailings.

Figure 6:
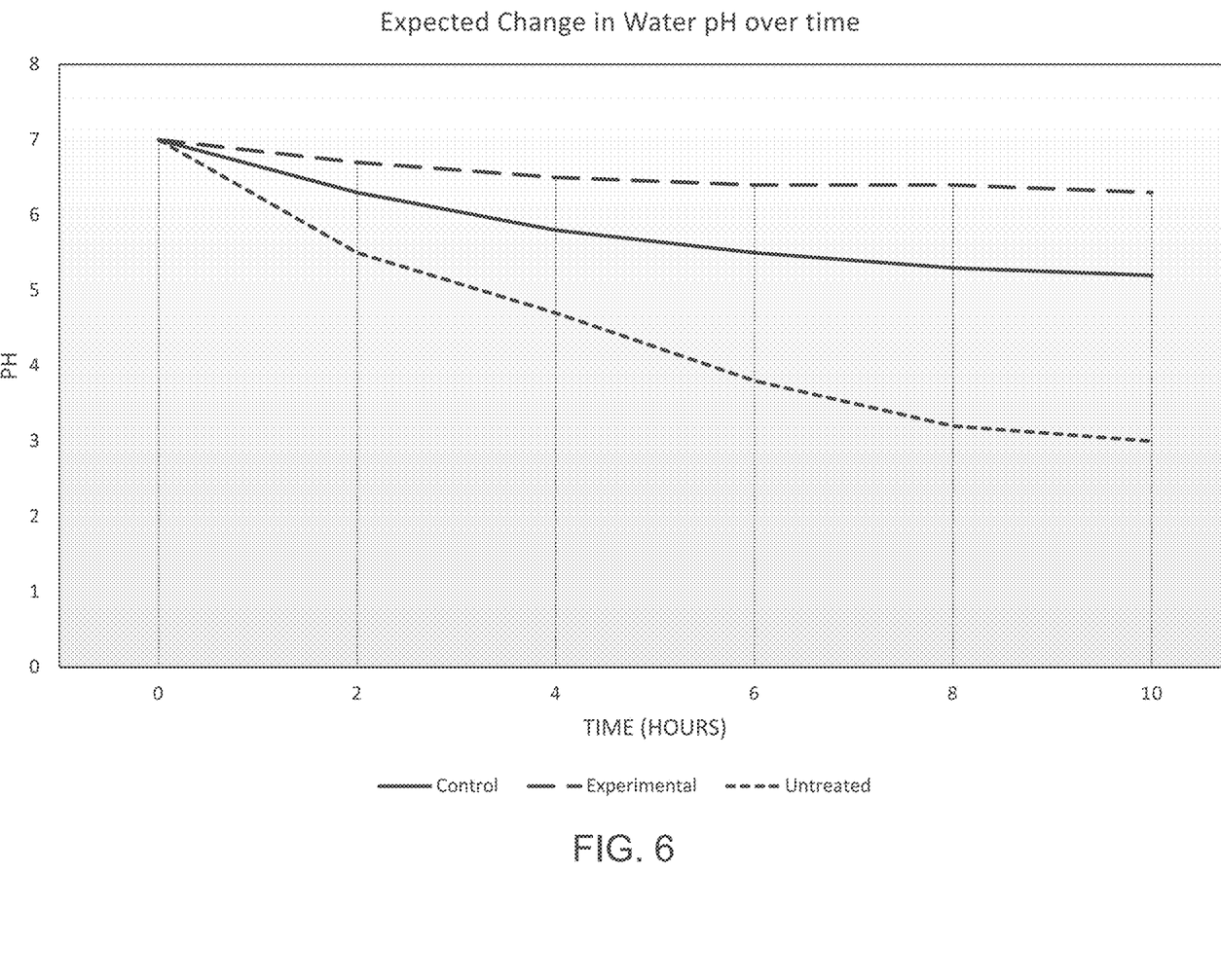
FIG. 6 is a graph showing changes of pH over time under three different conditions.

Results:

The performance of the ATA-AMD treated solids is expected to surpass that of the control and the untreated solids. FIG. 6 depicts a sample set of curves showing possible changes in water pH over time. As shown in FIG. 6, all three samples are expected to experience an exponential decay in pH. The initial drop in pH would likely be the result of a large surface area being initially exposed to air and water. A larger amount of sulfuric acid is formed initially, and as more of the surface area was exposed, the pH can drop more. The ATA-AMD treated solids sample can result in a smaller change in pH, as the $CaCO_3$ particles are able to neutralize the sulfuric acid and regulate pH immediately. There can still be a slight decrease in pH over time, as the amount of $CaCO_3$ released at a time would not be enough to completely counterbalance all acid formation. The curve leveling off over time at a pH between 6 and 7 would indicate that time-release mechanism is working well, and the $CaCO_3$ is not being released all at once. If this were the case, the levels would have begun to drop even more as time went on. The untreated tailings would be expected to show a larger change in pH, as they have a much lower solids content, so that their exposure to water would be much more significant than the ATA-treated samples.

Example 2: Preparation of Hydrophobic Precipitated Calcium Carbonate

A hydrophobic precipitated calcium carbonate (PCC) sample is created using 20 grams of PCC, 0.422 grams of stearic acid, and 45 mL of hexane. The stearic acid is first added to and mixed with the hexane. The PCC is then added to the stearic acid-hexane mixture and blended at 50 degrees Celsius for 30 minutes. The resulting mixture is cooked in an oven for two hours at 120 degrees Celsius. Once the sample is removed from the oven as a solid cake, the cake is broken up into a powder that resembles the original PCC in consistency.

Example 3: ATA Process

The ATA process allows the preparation of a consolidated solid by activating fine particulate matter, for example from mining tailings waste, and combining it with tether-bearing anchor particles. The process is commenced by introducing 400 ppm of activator polymer (active polymer per dry solids in the tailings), for example, high molecular weight polyacrylamides and modified polyacrylamides, such as high molecular weight anionic polyacrylamides, into a container with a predetermined amount of fine tailings obtained from mining wastewater. The fine tailings and activator polymer are mixed by inverting the container six times. A separate predetermined amount of coarse tailings obtained from mining wastewater is treated with 200 ppm of tether polymer (active polymer per dry solids in the tailings), for example, high molecular weight cationic polymers such as poly(DADMAC) polymers and cationic polyacrylamides, and is mixed or shaken for a few seconds, allowing the tether polymer to coat the coarse tailings, thereby forming tether-bearing anchor particles. Both the activator and the tether polymer solutions are created using 0.1% solutions of polymer actives in water. The activated fines are added to the tether-coated coarse tailings material, and the container is inverted six times. The contents of the container are then poured onto a Buchner funnel fitted with a 70 mesh screen, where the resulting solids are collected on the screen and clarified water drains through. A portion of the screened solids are then pressed between paper towels to simulate further dewatering. The solids contents of the gravity drained and pressed samples are measured with a moisture balance. The solids content of the pressed samples is expected to exceed the solids content of the gravity drained samples.

Hydrophobicity of the resulting material can be assessed in a number of ways. Moisture contact can be measured, or the materials can be tested visually or instrumentally. Contact angle for water droplets on the samples can provide a measure of hydrophobicity: when a drop of water is dropped on pressed samples, the experimental sample has a larger contact angle when visually inspected.

Example 4: Addition of Hydrophobic PCC to Fine Tailings

A hydrophobic PCC sample prepared as described in Example 2 is added as an adjunct to the activation step of the ATA process as described in Example 3. To accomplish this, an amount of hydrophobic PCC is added to a fine mining waste material, where the amount of hydrophobic PCC is about five percent of the solids content of the fines; this mixture is then agitated. A 400 ppm dosage of an activator polymer as described in Example 2 is added to the PCC-containing fines and inverted six times. A mixture of tether-bearing anchor particles is prepared separately by adding a 200 ppm dosage of a tether polymer as described in Example 2 to a coarse mining waste material and then inverting this mixture six times. The fines-plus-hydrophobic-PCC mixture is then combined with the tether-bearing anchor particles and is inverted six times. The draining and drying processes are performed as described in Example 3.

Example 5: Use of Hydrophobic PCC in Acid Mine Drainage Treatment

A simulation of acid mine drainage (AMD) treatment can be performed in accordance with Example 1. A Control sample (i.e., non-hydrophobized) is prepared as set forth for the Control in Example 1. One or more experimental samples containing hydrophobic PCC are prepared as described in Example 4. The experimental samples can then be compared with the Control in accordance with the following testing protocol, and conclusions can be drawn about the effect of hydrophobic PCC on the treatment of AMD.

To test the samples (both Control and experimental samples) about 20 gm of the sample being tested is placed in a container with multiple ports for tubing to be connected. The apparatus is attached to an air source to allow dry air to be pumped into the system containing the material at 80 mL/min for one hour. A Liebig condenser is used to pump humid air into the system at the same rate for one hour. Approximately 20 mL of deionized water with a pH of 7 is pumped into the system. This is done using a peristaltic pump that is connected to the apparatus to pump water in and out. The water is introduced to the system and is allowed to sit for 5 minutes before being removed. The pH of the water removed from the system is measured, and the water is discarded. The cycle of 1 hour of dry air, 1 hour of humid air, and 5 minutes of fresh deionized water is repeated four additional times. The entire experiment, with five rounds of dry air, humid air, and water is repeated with both the Control and with the experimental samples.

The hydrophobicity of the experimental sample is expected to exceed that of the Control. It is also expected that the solids content of the experimental sample would exceed that of the Control. Visually, the gravity drained and pressed experimental solids would not be expected to hold as much water as the Control does. In addition, when a drop of water is dropped on pressed samples, the experimental sample would have a larger contact angle when visually inspected, as compared with the Control. These findings would lead to the conclusion that the experimental sample is more hydrophobic than the Control. With the experimental sample being more hydrophobic, it is expected that an insufficient amount of acid will be produced in the experimental sample to cause acid mine drainage. The hydrophobicity of the experimental sample would prevent moisture from entering the sample and causing acid drainage, since contact of acid-forming solids with water is required for AMD. It is envisioned that, while a very slight drop in pH would occur over time in the treated solids, the pH would generally stay fairly constant, because the coated PCC in the experimental samples would be able both to prevent water from accessing the ATA solids and to counterbalance acid formation that would occur from the moisture that is still within the ATA solids. By contrast, the Control would be expected to show a larger change in pH, as it has a much lower solids content, so that exposure to water in the Control would be much more significant than the hydrophobized samples.

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of neutralizing acid drainage from particulate mining waste, comprising:
    i. affixing an activating polymer to the particulate mining waste in an aqueous stream to form activated particles in the aqueous stream, wherein the activating material is an anionic or cationic polymer;
    ii. affixing a tethering polymer to anchor particles to form tether-bearing anchor particles, wherein the tethering polymer is an anionic or cationic polymer having a charge opposite to that of the activator polymer;
    iii. adding the tether-bearing anchor particles to the activated particles in the aqueous stream, wherein the tethering polymer attaches the tether-bearing anchor particles to the activated particles to form removable complexes in the aqueous stream; and
    vi. removing the removable complexes from the aqueous stream to form a consolidated waste solid;
    the method further comprising:
    adding a hydrophobizing material to the particulate mining waste prior to step i or to the activating polymer prior to step i, wherein the hydrophobizing material comprises a fatty acid or a salt thereof;
    adding a controlled release base formulation (CRBF) to the particulate mining waste prior to step i, to the activating polymer prior to step i, to the tethering polymer prior to step ii, or to the anchor particles prior to step ii, wherein the controlled release base formulation (CRBF) comprises a particulate base coated with a controlled-release polymer;
    wherein the consolidated waste solid comprises the particulate material, the hydrophobizing material, and the CRBF; and
    wherein the CRBF responds to a decrease in pH from acid drainage from the particulate mining waste to release the particulate base, thereby neutralizing the acid drainage.

2. The method of claim 1, wherein hydrophobizing material is a substrate particle coated with the fatty acid or salt thereof.

3. The method of claim 1, wherein the fatty acid or salt thereof is selected from the group consisting of stearic acid, sodium stearate, oleic acid, sodium oleate, lauric acid, and sodium laurate.

4. The method of claim 2, wherein the fatty acid or salt thereof is selected from the group consisting of stearic acid, sodium stearate, oleic acid, sodium oleate, lauric acid, and sodium laurate.

5. The method of claim 3, wherein the fatty acid is stearic acid.

6. The method of claim 4, wherein the fatty acid is stearic acid.

7. The method of claim 2, wherein the substrate particle is a precipitated calcium carbonate particle.

8. The method of claim 1, wherein the particulate base is selected from the group consisting of sodium hydroxide, calcium hydroxide, calcium oxide, calcium carbonate, magnesium hydroxide and sodium carbonate.

9. The method of claim 8, wherein the particulate base is calcium carbonate.

10. The method of claim 1, wherein the controlled release polymer is selected from the group consisting of aminoalkyl methacrylate copolymer, polyvinyl acetal diethylaminoacetate polymer, polyethylene oxide, hydroxypropyl methylcellulose, polymethyl methacrylate, polyvinyl alcohol, and polylactic acid.

11. The method of claim 1, wherein the activator polymer is an anionic polymer and the tethering polymer is a cationic polymer.

12. The method of claim 11, wherein the activator polymer is an anionic polyacrylamide.

13. The method of claim 11, wherein the tethering polymer is poly(DADMAC) or a cationic polyacrylamide.

14. The method of claim 12, wherein the tethering polymer is poly(DADMAC) or a cationic polyacrylamide.

* * * * *